Sept. 20, 1955    J. L. OWEN ET AL    2,718,245
SAW BLADE
Filed May 19, 1953
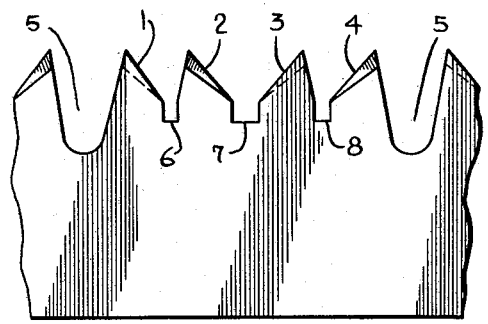
INVENTORS:
JONAS LEANDER OWEN &
ANDERS HERMAN PERSSON
BY
THEIR AGENTS.

United States Patent Office 2,718,245
Patented Sept. 20, 1955

2,718,245

SAW BLADE

Jonas Leander Owen and Anders Persson, Edsbyn, Sweden

Application May 19, 1953, Serial No. 355,952

1 Claim. (Cl. 143—133)

The invention relates to a saw blade.

The teeth of this blade are arranged in groups and the teeth groups are separated by saw dust accumulating spaces. The invention is a continuation-in-part application of our copending patent application Serial No. 99,052, filed June 14, 1949, now abandoned.

Saw blades provided with groups of teeth and having a different distance between the teeth points within these groups are known. However, these known saw blades often cause the formation of ridges in the cuts, creating thereby a hard stroke, reducing the cutting efficiency and cause an essential increase of power consumption.

It is the main object of the invention to eliminate these disadvantages.

It is a further object of the invention to prevent vibrations of the saw blade during work.

It is also an object of the invention to produce a surprisingly smooth run of the saw blade and to prevent premature filling-up of the saw with saw dust.

A saw blade complying with the above stated and additional objects, which will become apparent as this description proceeds, will now be described with reference to the attached drawing, showing a side view of a preferred embodiment thereof.

The saw blade shown in the drawing has its cutting edge divided into a plurality of teeth groups which are separated by the saw dust spaces 5. The individual groups consist of four teeth 1, 2, 3, 4.

These teeth are at their bases separated from each other by substantially rectangular grooves 6, 7, 8. These grooves 6, 7, 8, have a different width, the center groove 7 having a maximum width and the width of the two lateral grooves 6, 8 being different from each other.

Also the spacing of the points of the teeth 1, 2, 3, 4 differ in conformity with the width of the grooves 6, 7, 8, the spacing 7 between the points of teeth 2 and 3 being the largest; the spacings 6 and 8 are different from each other.

The advantages of this saw blade formation are numerous.

The travel of the saw blade through the wood is surprisingly smooth and uniform and the cut is accordingly even: the formation of the dreaded ridges in the saw cuts is entirely eliminated. The saw rides smoothly and the cut is more effective without necessitating an increase of the driving power.

The bottom spaces 6, 7, 8 between the individual teeth take up the chips and thereby contribute to the smooth run of the saw. Moreover, the provision of the differently sized grooves 6, 7, 8 at the teeth bottoms in cooperation with the different spacing of the teeth points greatly improves the operation of the saw and reduces vibration.

Since certain changes may be made in the above article and different embodiments of the invention could be made without departing from the scope thereof, it is intended that all matter contained in the above description or shown in the accompanying drawing shall be interpreted as illustrative and not in a limiting sense.

We claim:

A saw blade of which the cutting edge is divided into a plurality of teeth groups said groups being separated from each other by recesses provided in said blade and each group consisting of four teeth, the teeth of each pair of adjacent teeth of each group being at their points and at their bases differently spaced than the teeth of any other pair of adjacent teeth of the same group, the different spacing at the teeth bases being obtained by three grooves of different widths applied to the cutting edge, said grooves having a substantially rectangular shape and the center groove having a maximum width.

References Cited in the file of this patent

UNITED STATES PATENTS

| | | |
|---|---|---|
| 308,549 | Boynton | Nov. 25, 1884 |
| 2,072,624 | Owen | Mar. 2, 1937 |

FOREIGN PATENTS

| | | |
|---|---|---|
| 66,275 | Sweden | Oct. 30, 1928 |
| 163,464 | Austria | July 11, 1949 |
| 491,781 | Canada | Apr. 7, 1953 |